United States Patent
Lunner et al.

(10) Patent No.: US 11,823,548 B2
(45) Date of Patent: Nov. 21, 2023

(54) ARBORICULTURE SAFETY SYSTEM

(71) Applicant: HUSQVARNA AB, Huskvarna (SE)

(72) Inventors: Carl-Magnus Lunner, Spånga (SE); Josefin Rosén, Bandhagen (SE); Emelie Worrmann, Stockholm (SE)

(73) Assignee: HUSQVARNA AB, Huskvarna (SE)

( * ) Notice: Subject to any disclaimer, the term of this patent is extended or adjusted under 35 U.S.C. 154(b) by 16 days.

(21) Appl. No.: 17/252,047

(22) PCT Filed: Dec. 18, 2018

(86) PCT No.: PCT/EP2018/085428
§ 371 (c)(1),
(2) Date: Dec. 14, 2020

(87) PCT Pub. No.: WO2020/001802
PCT Pub. Date: Jan. 2, 2020

(65) Prior Publication Data
US 2021/0264762 A1    Aug. 26, 2021

(30) Foreign Application Priority Data
Jun. 27, 2018    (SE) .................... 1850801-0

(51) Int. Cl.
*G08B 21/04*    (2006.01)
*G08B 21/22*    (2006.01)
(Continued)

(52) U.S. Cl.
CPC ....... *G08B 21/043* (2013.01); *G08B 21/0446* (2013.01); *G08B 21/22* (2013.01); *G08B 7/06* (2013.01); *H04W 76/10* (2018.02)

(58) Field of Classification Search
CPC .. G08B 21/043; G08B 21/0446; G08B 21/22; G08B 7/06; H04W 76/10; F16P 3/147
See application file for complete search history.

(56) References Cited

U.S. PATENT DOCUMENTS 5,933,082 A * 8/1999 Abita ............ G08B 21/02 250/338.1
6,208,260 B1 * 3/2001 West ............ B66F 17/003 340/567
(Continued)

FOREIGN PATENT DOCUMENTS

AU    2007201914 A1    5/2007
CA    2433248 A1    12/2004
(Continued)

OTHER PUBLICATIONS

International Search Report and Written Opinion for International Application No. PCT/EP2018/085428 dated Apr. 16, 2019.
(Continued)

*Primary Examiner* — Curtis J King
(74) *Attorney, Agent, or Firm* — Burr & Forman LLP

(57) ABSTRACT

An arboriculture safety monitoring system (300) comprising at least one arboriculture safety monitoring device (200) and at least one arboriculture safety user interface device (100), the at least one arboriculture safety monitoring device (200) comprising at least one proximity sensor, a controller and a communication interface, the arboriculture safety user interface device (100) comprising alerting means, a communication interface, and a controller wherein the at least one arboriculture safety monitoring device (200) is configured to: connect to at least one of the at least one arboriculture safety user interface device (100), detect that a person has come within range of the at least one proximity sensor, and in response thereto emit an alert through alerting means of the arboriculture safety user interface device (100).

18 Claims, 7 Drawing Sheets

(51) Int. Cl.
*H04W 76/10* (2018.01)
*G08B 7/06* (2006.01)

(56) References Cited

U.S. PATENT DOCUMENTS

| | | | | |
|---|---|---|---|---|
| 6,347,551 | B1* | 2/2002 | Turpening | G01N 29/223 |
| | | | | 73/598 |
| 6,389,140 | B1 | 5/2002 | Wei | |
| 7,079,027 | B2* | 7/2006 | Wojcik | A01M 31/002 |
| | | | | 340/555 |
| 7,714,720 | B2 | 5/2010 | Hietanen et al. | |
| 8,400,268 | B1* | 3/2013 | Malik | G08B 13/1427 |
| | | | | 340/8.1 |
| 8,409,116 | B2 | 4/2013 | Wang et al. | |
| 8,903,104 | B2 | 12/2014 | Norris | |
| 9,407,738 | B2 | 8/2016 | Geiger et al. | |
| 9,549,544 | B1* | 1/2017 | Millsap | G08B 21/0247 |
| 9,640,057 | B1 | 5/2017 | Ross | |
| 9,818,282 | B2 | 11/2017 | Burton et al. | |
| 9,961,186 | B2 | 5/2018 | Li et al. | |
| 9,998,850 | B2 | 6/2018 | Broadley et al. | |
| 10,037,667 | B2 | 7/2018 | Desoyza | |
| 10,096,224 | B1* | 10/2018 | Kegley | G08B 25/016 |
| 10,327,071 | B2 | 6/2019 | Pedersen | |
| 10,959,022 | B1* | 3/2021 | Baumbach | H04R 5/04 |
| 2005/0033571 | A1 | 2/2005 | Huang et al. | |
| 2005/0237208 | A1* | 10/2005 | Wojcik | A01M 31/002 |
| | | | | 340/573.2 |
| 2007/0185749 | A1* | 8/2007 | Anderson | G06Q 50/02 |
| | | | | 340/572.1 |
| 2009/0121863 | A1 | 5/2009 | Prior | |
| 2012/0098654 | A1* | 4/2012 | Ebert | E02F 9/28 |
| | | | | 340/438 |
| 2012/0242486 | A1 | 9/2012 | Witkemper | |
| 2013/0143519 | A1 | 6/2013 | Doezema | |
| 2013/0183924 | A1 | 7/2013 | Saigh et al. | |
| 2013/0209109 | A1* | 8/2013 | Georgiano | B66F 17/006 |
| | | | | 398/140 |
| 2013/0271274 | A1* | 10/2013 | Ebert | E02F 9/2054 |
| | | | | 340/435 |
| 2013/0339019 | A1* | 12/2013 | Giancarlo | G10L 15/04 |
| | | | | 704/251 |
| 2014/0000982 | A1* | 1/2014 | Barnhill | B25J 5/02 |
| | | | | 182/133 |
| 2014/0096871 | A1 | 4/2014 | Kaye | |
| 2014/0307868 | A1 | 10/2014 | Weis | |
| 2014/0314245 | A1 | 10/2014 | Asada et al. | |
| 2014/0360037 | A1* | 12/2014 | DeLucia | G01N 33/0098 |
| | | | | 33/555.4 |
| 2015/0084768 | A1 | 3/2015 | Brooks | |
| 2015/0164377 | A1 | 6/2015 | Nathan et al. | |
| 2015/0269825 | A1 | 9/2015 | Tran | |
| 2015/0373521 | A1* | 12/2015 | Olesen | B63C 9/00 |
| | | | | 455/404.2 |
| 2016/0157756 | A1 | 6/2016 | Yu et al. | |
| 2016/0210838 | A1 | 7/2016 | Yan et al. | |
| 2017/0015336 | A1* | 1/2017 | Bartek | B61L 23/06 |
| 2017/0124837 | A1 | 5/2017 | Xing et al. | |
| 2017/0127749 | A1* | 5/2017 | Boeck | A61B 5/0002 |
| 2017/0180965 | A1* | 6/2017 | Esenwein | A61B 5/1117 |
| 2017/0236397 | A1* | 8/2017 | Myslenski | H04N 7/183 |
| | | | | 348/143 |
| 2017/0270481 | A1* | 9/2017 | Morgenthau | H04W 4/80 |
| 2018/0122219 | A1* | 5/2018 | Catering | H04L 9/3226 |
| 2018/0151037 | A1 | 5/2018 | Morgenthau et al. | |
| 2019/0008100 | A1* | 1/2019 | Hollmeier | B27B 17/0025 |
| 2019/0011271 | A1* | 1/2019 | Jaeger | A01G 23/00 |
| 2019/0333178 | A1* | 10/2019 | Cheng | G06Q 30/018 |
| 2019/0360177 | A1* | 11/2019 | Kiyota | G06T 11/00 |
| 2020/0005785 | A1* | 1/2020 | Mang | H04W 4/12 |
| 2020/0119538 | A1* | 4/2020 | Johnson | H02H 1/0092 |
| 2021/0289319 | A1* | 9/2021 | Antony | G06F 8/65 |
| 2021/0358282 | A1* | 11/2021 | Lin | G01P 15/00 |
| 2022/0171412 | A1* | 6/2022 | Cui | G05D 1/0055 |
| 2022/0203514 | A1* | 6/2022 | Dennis | B25F 5/006 |
| 2022/0316918 | A1* | 10/2022 | Argo | G01C 21/383 |
| 2022/0351596 | A1* | 11/2022 | Hatton | H04W 4/38 |

FOREIGN PATENT DOCUMENTS

| | | |
|---|---|---|
| CN | 200962660 Y | 10/2007 |
| CN | 106781275 A | 5/2017 |
| CN | 110177315 A | 8/2019 |
| EP | 3421988 A1 | 1/2019 |
| ES | 2559643 A1 | 2/2016 |
| JP | 3021076 U | 2/1996 |
| JP | 2008065720 A | 3/2008 |
| WO | 2074772 A2 | 1/2002 |
| WO | 2017167781 A1 | 10/2017 |
| WO | 2017167783 A1 | 10/2017 |
| WO | 2017167793 A1 | 10/2017 |
| WO | 2018094520 A1 | 5/2018 |

OTHER PUBLICATIONS

Office Action and Search Report for Swedish Application No. 1850801-0 dated Jan. 25, 2019.

International Preliminary Report on Patentability for International Application No. PCT/EP2018/085428 dated Dec. 29, 2020.

* cited by examiner

ARBORICULTURE SAFETY SYSTEM

TECHNICAL FIELD

This application relates to forestry safety devices, methods and systems and in particular to safety devices, methods and systems for arboriculture.

BACKGROUND

Arboriculture, or sometimes called tree surgery, is in general associated with many risks and dangers, wherefore safety is paramount. Arborists and other persons engaged in tree surgery or pruning are therefore skilled and experienced professionals trained in various safety aspects. Nevertheless, safety can always be improved, especially as the environment by its very nature is difficult to monitor from a safety point of view. As part of the safety equipment worn by persons associated with tree felling or such related work are helmet, goggles or a visor and hearing protection. In many states these are a legal requirement for minimum protection. Additionally tree surgery personnel wears safety boots and safety garments, such as pants and jackets, sometimes restricting the movements and maneuverability of the person wearing them.

Taking into account the physical limitations posed by the safety equipment and the often times, difficult to survey terrain, it is difficult for the forestry personnel to notice and be aware of all movement and events in a work area. Especially for arborists that may be working high up in a tree and have the view of the ground shrouded by the very tree that is being worked on. Ground staff may be used to survey the ground area, but usually the ground staff is focused on facilitating the work of the climbing arborists and to monitor his/her safety.

The arborists have one of the most hazardous professions in the world, working on great heights with dangerous equipment. Accidents, such as; getting hit by falling branches and logs when working on the ground, falling when working in trees, and cutting themselves with the saw do occur, often due to lack of concentration and tiredness. Arborists also need to keep civilians safe from the danger zone on the work site. Statistics from Health and Safety Executive in the UK reveals that 516 non-fatal major injuries and 27 fatal incidents occurred in the arboriculture profession during a nine year period of time, between 2002-2010 (Health and Safety Executive, 2017). Communication is essential for the arborists to perform their tasks. Today this is most commonly achieved either by shouting and screaming, gesticulating, or using the noise from the chainsaw to get the attention of a colleague in the loud outdoor environment.

The visibility through branches and leaves is often poor, and it is difficult to discover if someone is underneath the tree. Logs and branches are continuously being cut off and dropped, it is therefore of vital importance that the zone under the tree is clear from people, both other arborists and civilians. Staying clear from falling debris is familiar to the arborist and part of the workflow at the site, but the curious bystanders are not aware of this danger. It is one of the duties of the arborist on the ground to ensure that no one enters beneath trees that are being worked on, but that is not always possible due to other obligations that must be conducted simultaneously. Today, arborist use warning signs to inform that work is in progress, despite that, it is common that unauthorized persons enter the work site and the danger zone.

When working on heights there is always a risk of falling down. Falling is always dangerous, even if the arborist is caught by his anchoring system he could still get knocked unconscious and be left hanging upside down. This type of accident requires a quick response.

In order to facilitate communication and thereby increased safety among forestry personnel headsets may be worn that enable wireless communication (walkie talkie) amongst the forestry personnel.

Although this greatly increases the safety of the personnel now being able to communicate freely, it does not provide much improved safety as relates to passers-by and other events that are not verbally communicated.

Thus, there is a need for improved safety for forestry personnel such as tree loggers and especially arborists.

SUMMARY

It is therefore an object of the teachings of this application to overcome or at least reduce the problems discussed herein by providing an arboriculture safety monitoring system comprising at least one arboriculture safety monitoring device and at least one arboriculture safety user interface device, the at least one arboriculture safety monitoring device comprising at least one proximity sensor, a controller and a communication interface, the arboriculture safety user interface device comprising alerting means, a communication interface, and a controller wherein the at least one arboriculture safety monitoring device is configured to: connect to at least one of the at least one arboriculture safety user interface device, and detect that a person has come within range of the at least one proximity sensor, and the arboriculture safety user interface device is configured to, in response thereto, emit an alert through alerting means of the arboriculture safety user interface device.

In one embodiment at least one of the at least one arboriculture safety monitoring device is an arboriculture safety monitoring device according to below and at least one of the at least one arboriculture safety user interface device is an arboriculture safety user interface device according to below.

It is also an object of the teachings of this application to overcome or at least reduce the problems by providing a method for use in an arboriculture safety monitoring system comprising at least one arboriculture safety monitoring device and at least one arboriculture safety user interface device, the at least one arboriculture safety monitoring device comprising at least one proximity sensor, and a communication interface, the arboriculture safety user interface device comprising alerting means, and a communication interface, the method comprising the at least one arboriculture safety monitoring device: connecting to at least one of the at least one arboriculture safety user interface device, detecting that a person has come within range of the at least one proximity sensor, and in response thereto emitting an alert through alerting means of the arboriculture safety user interface device.

According to one aspect, it is also an object of the teachings of this application to overcome or at least reduce the problems discussed herein by providing an arboriculture safety monitoring device comprising at least one proximity sensor, alerting means, at least one carrier on which the at least one sensor is arranged, a controller and a communication interface, the arboriculture safety monitoring device being configured to: establish a communication connection with at least one arboriculture safety user interface device; detect that an event has taken place; and in response thereto emit an alert through the alerting means and/or through alerting means (150) of the arboriculture safety user interface device.

In one embodiment the sensor is associated with a range representing a safety zone, and the arboriculture safety monitoring device is further configured to detect the event by determining that a person has entered the safety zone by determining that the person is within the range of the sensor.

In one embodiment the arboriculture safety monitoring device is further configured to receive a command to activate or deactivate the safety zone.

In one embodiment the arboriculture safety monitoring device is further configured to emit the alert remotely by communicating with the arboriculture safety user interface device and thereby emitting the alert remotely through alerting means of the arboriculture safety user interface device.

In one embodiment the event is that a user has fallen which is detected by receiving data on a fall event from the arboriculture safety user interface device.

In one embodiment the at least one sensor is a plurality of sensors, wherein the plurality of sensors are arranged on said at least one carrier by being distributed on the carrier. By way of example, the sensors may be distributed on the carrier in such a manner to permit a 360-degree field of detection. Thereby, if suspended about a tree trunk, the arboriculture safety monitoring device may allow detection of people approaching the tree from any direction.

In one embodiment the at least one carrier is arranged to be attached to a tree.

In one embodiment the arboriculture safety monitoring device is further configured to transmit data on the event to a service provider.

It is also an object of the teachings of this application to overcome or at least reduce the problems by providing a method for use in an arboriculture safety monitoring device comprising comprising at least one proximity sensor, alerting means, at least one carrier on which the at least one sensor is arranged, and a communication interface, the method comprising: establishing a communication connection with at least one arboriculture safety user interface device; detecting that an event has taken place; and in response thereto emitting an alert through the alerting means and/or through alerting means of the arboriculture safety user interface device.

According to one aspect, it is also an object of the teachings of this application to overcome or at least reduce the problems by providing an arboriculture safety monitoring device comprising at least one proximity sensor associated with a range representing a safety zone, alerting means, at least one carrier on which the at least one sensor is arranged, and a controller, the arboriculture safety monitoring device being configured to: detect that an event has taken place by determining that a person has entered the safety zone by determining that the person is within the range of the sensor; and in response thereto emit an alert through the alerting means.

According to an embodiment, the carrier may comprise a suspension arrangement adapted for suspending the arboriculture safety monitoring device on a tree, for example a suspension arrangement adapted for suspending the arboriculture safety monitoring device on the trunk of a tree. Such a suspension arrangement may be configured as a flexible strap. Typically, an arborist may climb a tree having a tree trunk diameter exceeding about 25 cm, and the suspension arrangement may be configured accordingly.

All the embodiments and features of an arboriculture safety monitoring device discussed above and below also apply to this arboriculture safety monitoring device, and vice versa, apart from features solely relating to communication interfaces.

It is also an object of the teachings of this application to overcome or at least reduce the problems by providing a method for use in an arboriculture safety monitoring device comprising at least one proximity sensor associated with a range representing a safety zone, alerting means, and at least one carrier on which the at least one sensor is arranged, the method comprising detecting that an event has taken place by determining that a person has entered the safety zone by determining that the person is within the range of the sensor; and in response thereto emitting an alert through the alerting means.

According to one aspect, it is also an object of the teachings of this application to overcome or at least reduce the problems discussed herein by providing an arboriculture safety monitoring device comprising at least one sensor of which at least one is a fall sensor, a controller and a communication interface, the arboriculture safety user interface device being configured to: establish a communication connection with at least one other arboriculture safety user interface device; detect that a fall event has taken place.

In one embodiment the arboriculture safety user interface device further comprises alerting means and is further configured to emit an alert at least through the alerting means.

In one embodiment the arboriculture safety user interface device is further configured to detect that a fall event has taken place by receiving data from the at least one fall sensor to that effect, indicating that a user of the arboriculture safety user interface device that has fallen, and in response thereto emitting an alert through at least alerting means of the another arboriculture safety user interface device.

In one embodiment the arboriculture safety user interface device is further configured to detect that a fall event has taken place by receiving data from the other arboriculture safety user interface device to that effect, indicating that a user of the another arboriculture safety user interface device has fallen, and in response thereto emitting an alert through at least the alerting means of the arboriculture safety user interface device.

In one embodiment the arboriculture safety user interface device is further configured to connect to an arboriculture safety monitoring device; detect that an event has taken place and in response thereto emit an alert, wherein the detection of that the event has taken place is based on receiving data to that effect from the arboriculture safety monitoring device and thereby emitting the alert at least through the alerting means, and/or wherein the detection of that the event has taken place is based on receiving data to that effect from the sensor and thereby emitting an alert at least through alerting means of the arboriculture safety monitoring device.

In one embodiment the arboriculture safety user interface device is further configured to detect an event indicating that an object, such as a person, has entered a safety zone, that a user has fallen, that the safety zone has been activated or deactivated, or that a working tool has been activated or deactivated. Optionally, the arboriculture safety user interface device may be configured to, in response to the event, emit an alert via the alerting means.

In one embodiment the arboriculture safety user interface device is further configured to send data regarding the event to a service provider.

In one embodiment the arboriculture safety user interface device is a communication headset for voice communication.

In one embodiment the arboriculture safety user interface device is a communication headset for voice communication utilizing a laryngophone.

It is also an object of the teachings of this application to overcome the problems or at least reduce by providing a method for use in an arboriculture safety user interface device comprising at least one sensor of which at least one is a fall sensor, a controller and a communication interface, the method comprising: establishing a communication connection with at least one other arboriculture safety user interface device; detecting that a fall event has taken place.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; Like numbers refer to like elements throughout.

It should be noted that even though the description given herein will be focused on safety arrangements and equipment for arborists specifically, it may also be used for other forestry works, such as by tree loggers when tree felling, shrubbery work, clearing work.

Figure 1A:
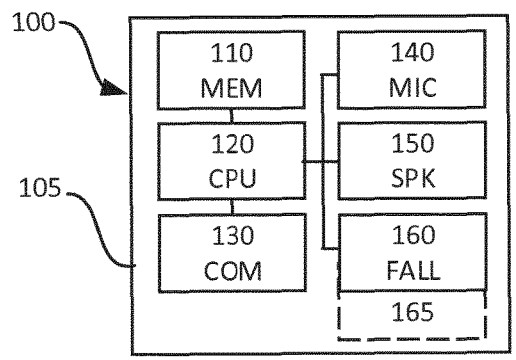
FIG. 1A shows a schematic view of the components of an arboriculture safety user interface device according to one embodiment of the teachings herein.

FIG. 1A shows a schematic view of the components of an arboriculture safety user interface device 100, configured as a tree pruning safety user interface device, according to one embodiment of the teachings herein.

The arboriculture safety user interface device 100 comprises a memory 110 (MEM) for storing software instructions indicative of the operation of the arboriculture safety user interface device 100. The arboriculture safety user interface device 100 also comprises a controller 120 (CPU) for controlling the overall operation of the arboriculture safety user interface device 100. The controller 120 may be one or several processors or other programmable circuits, either sharing the workload or working conjointly.

The controller 120 is connected to the memory 110 for receiving computer instructions that when loaded into and executed by the controller 120 executes and controls the operation of the arboriculture safety user interface device 100.

Figure 2B:
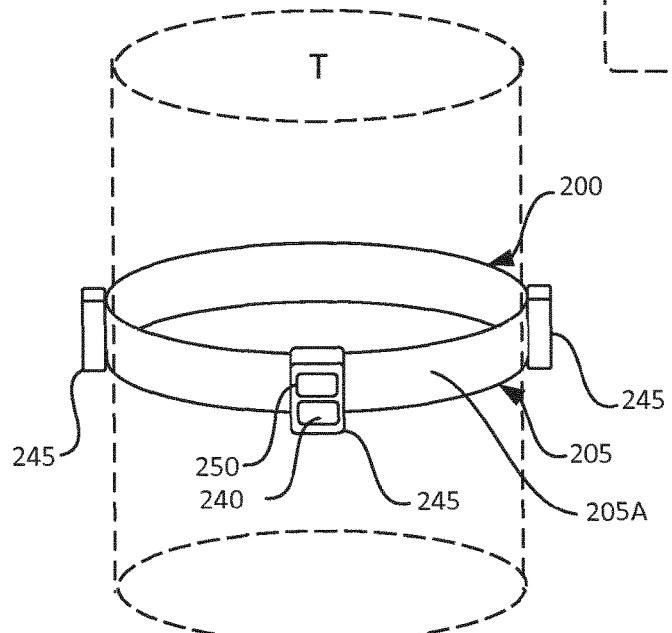
FIG. 2B shows an example of an arboriculture safety monitoring device according to one embodiment of the teachings herein.
Figure 2A:
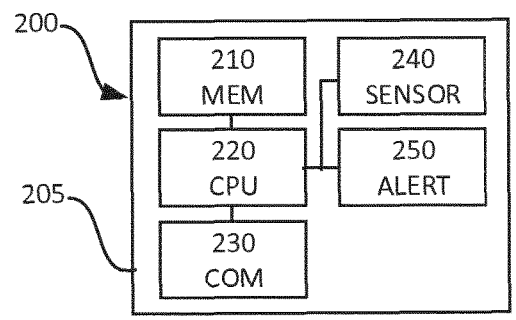
FIG. 2A shows a schematic view of the components of an arboriculture safety monitoring device according to one embodiment of the teachings herein.
Figure 3:
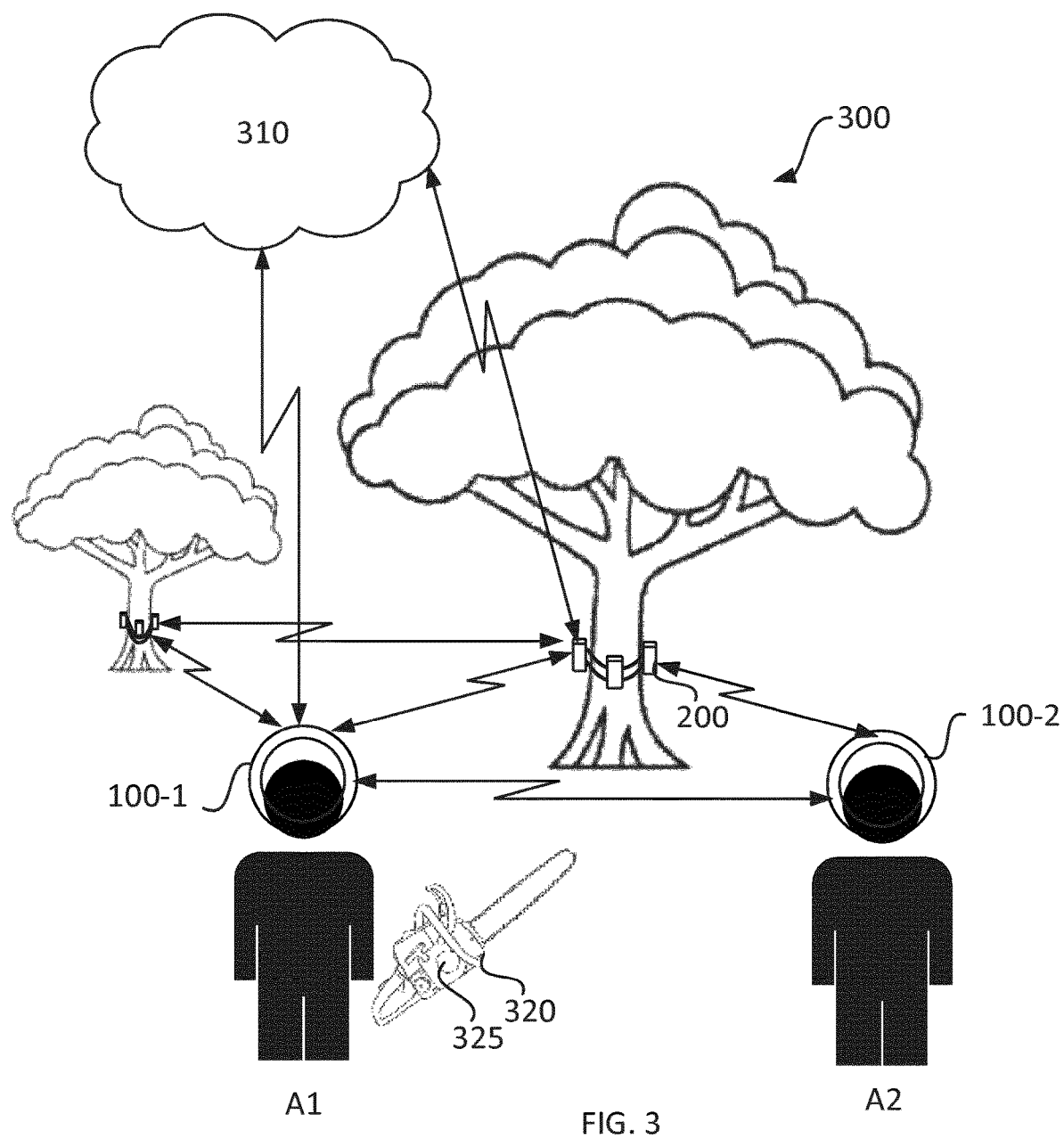
FIG. 3 shows an example of an arboriculture safety monitoring system according to the teachings herein.

The controller 120 is also connected to a communication interface 130 (COM) that enables the controller to communicate with other arboriculture safety user interface devices 100, an arboriculture safety monitoring device (referenced 200 in FIGS. 2A and 2B), sensors (such as a fall sensor 160 if housed remotely), speaker(s) 150 (if housed separately), microphone(s) 140 (if housed separately) and/or a cloud server or service (referenced 310 in FIG. 3). The communication interface 130 may be wireless, but may also be a combination of wired and wireless interfaces. Examples of wireless interfaces are Wi-Fi, Bluetooth, RFID, GSM and LTE. A combination of wireless interfaces is possible such as Bluetooth for communication between controller and speakers 150/microphone 140, Wi-Fi for communication with an arboriculture safety monitoring device (referenced 200 in FIGS. 2A and 2B), and/or a GSM or LTE interface for communicating with a cloud server or service (referenced 310 in FIG. 3).

Examples of wired interfaces are USB and TRS (/TRRS). A combination of wired interfaces is possible such as TRS(/TRRS) for communication between controller and speakers 150/microphone 140 and USB for communication between fall sensor 160 and controller 120.

As noted above, a combination of wireless and wired interfaces is possible, such as TRS(/TRRS) for communication between controller 120 and speaker(s) 150/microphone 140), Bluetooth for communication between controller 120 and fall sensor(s) 160, Wi-Fi for communication with an arboriculture safety monitoring device (referenced 200 in FIGS. 2A and 2B), and/or a GSM or LTE interface for communicating with a cloud server or service (referenced 310 in FIG. 3).

The communication interface 130 may also or alternatively be used to connect the arboriculture safety user interface device 100 to a cellular communication device, such as a cellular phone. This enables the carrier to communicate through his cell phone using the arboriculture safety user interface device as a headset for the cellular phone.

As indicated above, the arboriculture safety user interface device 100 also comprises at least one voice recording device, such as a microphone 140 (MIC) for recording or at least picking up a user's voice as the user talks.

The communication interface 130 is also arranged to provide the controller 120 with communication, such as spoken words from another arboriculture safety user interface device 100 that can be played through the one or more speakers. In one embodiment the speaker(s) is an example of alerting means 150. The alerting means 150 may alternatively or additionally include means for alerting a user such as lights arranged to blink or light up in a controlled manner.

The alerting means 150 may alternatively or additionally include means for alerting a user such as a vibrator arranged to vibrate in a controlled manner.

The alerting means 150 may alternatively or additionally include means for alerting a user such as a sounder arranged to emit a sound in a controlled manner.

The arboriculture safety user interface device 100 may also comprise or at least be connectable to a fall sensor 160 (FALL). The fall sensor 160 may comprise an accelerometer that provides accelerometer data that may be interpreted, for example by the controller 120, to be indicative of the user falling. Fall sensors are generally known and the reader is directed to fall sensors in general for examples on how to implement one. In general, automatic fall detection sensors are typically built into a device that may also be worn on a user's body, such as around the user's neck, waist or wrist, depending on the system. These fall sensors comprise detection sensors (multiple accelerometers and processors) that are arranged to detect and differentiate between normal activity, and an actual fall. By continuously measuring the speed of movements in all directions, the fall detector can compare what it senses to what it considers an actual fall. In one example, a detected acceleration is compared to an acceleration limit and the time for the acceleration is compared to a time limit. If both the acceleration exceeds the acceleration limit and the time of the acceleration exceeds the time limit, it may be determined that a fall has occurred. The acceleration may also or alternatively be measured in more than one dimension establishing a direction, wherein the direction may also be compared to a direction interval. If the determined direction interval is within a reference interval, this will also indicate a fall.

The fall sensor 160 may also include or be connected to an auxiliary health sensor 165, such as a heart rate monitor, monitoring the heart rate of the user, thereby enabling for detection of heart failure or heart problems potentially before they become a serious and acute problem for the user.

In one embodiment the arboriculture safety user interface device 100 is arranged with more than one sensor 160(/165), or at least with the capability of being connected to one or more sensors 160(/165).

The components may be housed in one or more housings 105. The exact number of housings and the shape and design of such housings depend on the chosen embodiment for the arboriculture safety user interface device.

The arboriculture safety user interface device 100 may also comprise a user interface 170 comprising zero, one or more buttons, zero, one or more lights that are arranged to light up in a controlled manner for providing information, and/or zero, one or more displays for providing information. The display may be a touch display, wherein zero, one or more of the zero, one or more buttons may be a virtual button.

A arboriculture safety user interface device 100 such as disclosed herein is thus operating as an active ear for the user, providing an agile, passive, noise cancelling device which provides the ability to communicate in loud or noisy environments and which is capable of automatically generating fall alerts. The arboriculture safety user interface device 100 may also provide In-Ear ear buds with adequate noise cancelling, microphone for ambient sound, throat microphone, VOX (voice operated switch) and PTT (push to talk) communication, wireless communication unit (Wi-Fi/Bluetooth/other) allowing full duplex audio and data communication, accelerometer-gyroscope (fall detector), RFID (Radio Frequency Identification) (for pairing with Active Safety Zone Monitor, such as an arboriculture safety monitoring device disclosed below), and/or optionally a rechargeable battery.

Figure 1B:
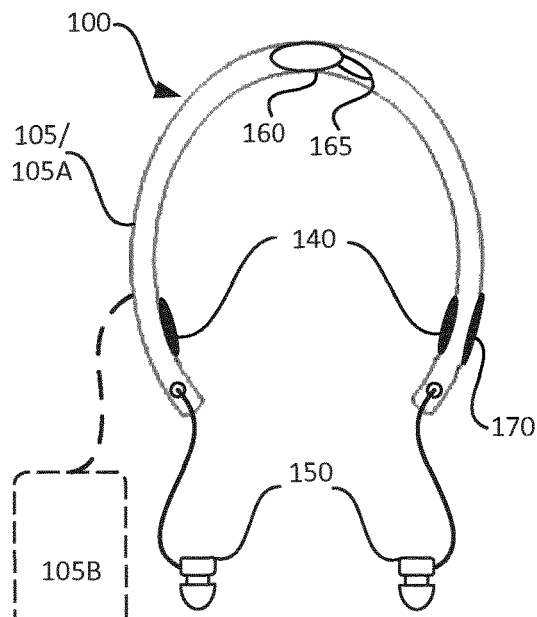
FIG. 1B shows an example of an arboriculture safety user interface device according to one embodiment of the teachings herein.

FIG. 1B shows an example of an arboriculture safety user interface device 100, configured as a tree pruning safety user interface device, according to one embodiment of the teachings herein. In one embodiment the arboriculture safety user interface device 100 is a headset. In such an embodiment the voice recording device 140 (MIC) is a sound microphone.

In one embodiment the housing 105 is the actual head band including any adjustable arms potentially for holding the speaker(s) 150 (SPK). The headband may additionally hold the fall sensor 160 (FALL), or alternatively the fall sensor may be housed in a boom carrying the microphone 140. In an embodiment having an auxiliary health sensor (165), a controller of the sensor 165 may be housed in the headband, while a sensor strap is arranged around the wearer's chest (or wrist), as is common for heart rate monitors.

In one embodiment the housing 105 is a helmet incorporating the head set 100. In one embodiment the housing 105 is arranged to be housed in a helmet.

In one embodiment the arboriculture safety user interface device 100 is a device to be worn on a work harness or affixed to another garment, for example through the use of carabiners, a common tool in forestry and arboriculture. The housing of such a device is preferably made very robust as it is likely to sustain blows during a fall or even during normal work. As it is to be affixed to a garment it does not need to be flexible or adaptable in its structure. The voice recording device 140 may be a sound microphone 140 attached to the arboriculture safety user interface device 100, or connected through a wired interface or wirelessly to the arboriculture safety user interface device 100 and attached for example on the collar of the worker's jacket. The speaker 150 may similarly be housed in the arboriculture safety user interface device 100 or connected through a wired interface or wirelessly to the arboriculture safety user interface device 100.

In the embodiment shown in FIG. 1B, the arboriculture safety user interface device 100 is configured as a laryngophone, otherwise known as a throat microphone 100, with extended capabilities. The laryngophone 100 shown in FIG. 1B has a neck strap 105A for affixing around a user's throat.

The neck strap 105A holds one or two transducers 140 to be arranged adjacent a user's throat for picking up vibrations when the user talks. The transducers 140 thereby act as the voice recording devices 140, i.e. correspond to the microphones of the other embodiments. Technically not being microphones as microphones may be understood to be, the transducers 140 will be considered as corresponding to microphones for the purpose of rendering this application easier to read. A skilled person reading this would understand that in a laryngophone the transducers 140 are performing the same tasks as the microphones in other embodiments and would understand to use these terms interchangeably, depending on which embodiment of the arboriculture safety user interface device 100 being discussed.

For the purpose of this application, a laryngophone will be considered to include the whole assembly, not only the transducers, the transducers technically being the actual laryngophone. This is in line with common nomenclature.

The neck strap 105A may also be connected to (or at least offer a connection to) one or two ear plugs 150, being the speakers of the arboriculture safety user interface device, being exemplified by the laryngophone 100 in FIG. 1B. The ear plugs 150 may technically be connected to the component device 105B in embodiments utilizing such a device (see below), but wired earplugs 150 are most likely at least wired through the neck strap for holding the wires in place.

The ear plugs 150 are examples of the speaker(s) 150, but it should be noted that ear plugs are but one example, and headphones may also be used. Similarly, even though FIG. 1B shows two ear plugs 150, embodiments with a single ear plug 150 are also within the scope of this application.

In one embodiment the ear plug(s) and/or the head phone(s) are noise cancelling. Noise cancelling headphones/ ear plugs are generally known and the skilled reader is directed to such ear plugs/head phones for details on how to implement them. In general, noise cancellation, also known as Active noise control (ANC) or active noise reduction (ANR), is a method for reducing unwanted sound by the addition of a second sound specifically designed to cancel the first.

In one embodiment the neck strap is arranged to house components such as a power source and the communication interface 130 and in such an embodiment the neck strap is the housing 105 of the arboriculture safety user interface device 100. In one embodiment the neck strap is arranged to house the microphone 140 and possibly the speaker(s), or at least connectors for the speaker(s) 150, whereas components such as a power source and the communication interface 130 are housed in a component device 105B and in such an embodiment the neck strap in combination with the component device 105B is the housing 105 of the arboriculture safety user interface device 100. However, in an embodiment where the controller and memory are housed in a component device 105B, that component device 105B is considered to be the primary part of the housing 105 of the arboriculture safety user interface device 100. As is indicated in FIG. 1B by the dashed lines, the component device 105B is optional.

The fall sensor may be housed in the neck strap 105A or in the component device 105B. Alternatively the fall sensor(s) 160 may be a standalone device being connected (wired or wirelessly) to the neck strap 105A or in the component device 105B. As indicated above, more than one fall sensor 160 may be utilized.

The same applies to the controller 120, the memory 110, the communication interface 130 and/or any power source.

As will be discussed later, one arboriculture safety user interface device may be configured to establish a communications connection with a second arboriculture safety user interface device through the use of their respective communication interfaces 130. A connection may be established directly, or via an intermediate device. The intermediate device may be an arboriculture safety monitoring device (which will be discussed in more detail with reference to FIGS. 2A and 2B). Alternatively or additionally, the communication may be established via a third arboriculture safety user interface device. In this manner, a communication network may be established between arboriculture safety user interface devices utilizing arboriculture safety monitoring devices and/or other arboriculture safety user interface devices as relay stations, thereby forming device-to-device communication network.

Alternatively or additionally, the communication may be established via a cellular or other communication network possibly including a server and/or a base station for acting as a relay station of the communication between the arboriculture safety user interface devices.

The communication effected may relate to voice communication and/or data communication. The voice communication enables the users of the arboriculture safety user interface devices 100 to communicate with one another, giving advice, warning or directions to one another during working operations. The data communication enables respective arboriculture safety user interface device 100 to exchange data, such as on actions or events affecting the user, to the other arboriculture safety user interface device or its user. The arboriculture safety user interface device 100 is configured to receive such data communication and to process it for determining whether an alert should be emitted to its user through the alert means 150. The alert may be emitted as a visual indication, as a vibration, and/or as informative voice message.

In one embodiment, a first arboriculture safety user interface device 100 is configured to enable a detection of a fall utilizing the fall sensor 160. The actual fall determination may be made by a controller in the fall sensor, the controller 120 of the arboriculture safety user interface device 100, a controller of the arboriculture safety monitoring device 200, a server in a cloud service, and/or by the controller of the receiving arboriculture safety user interface device 100. In one such embodiment the fall determination is performed by the arboriculture safety user interface device 100, either in the fall sensor 160 or in the controller 120. As has been indicated previously, the controller may comprise one or more processors. Any processor or controller of the fall sensor 160 may be seen as being comprised in the arboriculture safety user interface device's controller 120, whereby no difference will be made which processor or controller actually performs the fall determination as in either case, it is seen as to have been made by the general controller 120 of the arboriculture safety user interface device 100.

Through enabling communication between a first and a second arboriculture safety user interface device 100, a fall detection in the first arboriculture safety user interface device 100 may be communicated to the second arboriculture safety user interface device 100, whereby the user of the second arboriculture safety user interface device 100 may be alerted to that the first user has had a fall, and most likely needs assistance or at least be checked on whether assistance is needed. This enables both users to be aware of the others' actions despite a noisy working environment often with blocked or obstructed lines of vision.

The headset, the helmet and the laryngophone exemplified above as being embodiments of an arboriculture safety user interface device 100 are examples of a communication headset for voice communication.

FIG. 2A shows a schematic view of the components of an arboriculture safety monitoring device 200, configured as a tree pruning safety monitoring device, according to one embodiment of the teachings herein.

The arboriculture safety monitoring device 200 comprises a memory 210 (MEM) for storing software instructions indicative of the operation of the arboriculture safety monitoring device 200. The arboriculture safety monitoring device 200 also comprises a controller 220 (CPU) for controlling the overall operation of the arboriculture safety monitoring device 200. The controller 220 may be one or several processors or other programmable circuits, either sharing the workload or working conjointly. The arboriculture safety monitoring device comprises a housing 205 that houses the memory 210 and the controller 220. The memory 210 and/or the controller 220 may be housed centrally in the housing or distributed in the housing. As will be described in detail in relation to FIG. 2B, the housing 205 may include an attachment means 205A, such as a flexible strap 205A. However, the housing may also be arranged to be connected or inserted into the attachment means 205A, making it possibly to use the same arboriculture safety monitoring device with different attachment means 205A. As will be discussed in detail below, the housing 205 is arranged to carry sensors possibly in cooperation with an attachment means 205A. The housing 205 will therefore also be referenced a carrier (205) possibly including the attachment means 205A.

The controller 220 is connected to the memory 210 for receiving computer instructions that when loaded into and executed by the controller 220 executes and controls the operation of the arboriculture safety monitoring device 200.

The controller 220 is also connected to one or more sensors 240 for receiving sensor data to be analyzed to determine an event occurring.

The controller 220 is also connected to alerting means to provide information to a user or any other person in the vicinity of the arboriculture safety monitoring device 200.

The controller 220 is also connected to a communication interface 230 (COM) that enables the controller to communicate with an arboriculture safety user interface device 100, other arboriculture safety monitoring devices 200, sensors (such as a fall sensor 160 of an arboriculture safety user interface device 100, or a sensor of the arboriculture safety monitoring device 200), alert means (250 if housed separately), and/or a cloud server or service (referenced 310 in FIG. 3). The communication interface 230 may be wireless, but may also be a combination of wired and wireless interfaces.

Examples of wireless interfaces are Wi-Fi, Bluetooth, RFID, GSM and LTE. A combination of wireless interfaces is possible such as Bluetooth for communication between controller and alert means 250, Wi-Fi for communication with an arboriculture safety user interface device 100 and/or another arboriculture safety monitoring device 200, and/or a GSM or LTE interface for communicating with a cloud server or service (referenced 310 in FIG. 3).

Examples of wired interfaces are USB and TRS (/TRRS). A combination of wired interfaces is possible such as TRS(/TRRS) for communication between controller and alert means 250 and USB for communication between a sensor 240 and the controller 220.

As noted above, a combination of wireless and wired interfaces is possible, such as TRS(/TRRS) for communication between controller 220 and alert means 250), Bluetooth for communication between controller 220 and sensor(s) 240, Wi-Fi for communication with an arboriculture safety user interface device 100 or another arboriculture safety monitoring device 200, and/or a GSM or LTE interface for communicating with a cloud server or service (referenced 310 in FIG. 3).

The communication interface 230 is also arranged to provide the controller 220 with communication, such as spoken words from an arboriculture safety monitoring device 200 that can be played through alerting means 250, such as one or more speakers 250 for broadcasting a spoken message.

The alerting means 250 may alternatively or additionally include means for alerting a user such as lights arranged to blink or light up in a controlled manner. The alerting means 250 may alternatively or additionally include means for alerting a user such as a vibrator arranged to vibrate in a controlled manner.

The alerting means 250 may alternatively or additionally include means for alerting a user such as a sounder arranged to emit a sound in a controlled manner.

The sensor 240 may be a proximity sensor, such as a Passive Infra-Red (PIR) sensor. The sensor 240 may be a movement sensor. The sensor 240 may be a camera configured to detect the presence of an object and possibly to track that object to determine whether the object is in a location where it may be in danger, and/or if the object is in a location where it may pose a threat of danger to a user or another person.

The sensor 240 may be associated with a range. In one embodiment, the range is a set value, for example 10 m. In one embodiment, the range is user configurable. A first sensor 240 may be associated with a first range and a second sensor may be associated with a second range. The range may be used to effect a safety zone.

The arboriculture safety monitoring device 200 may comprise one or more sensors 240. The sensors 240 may be of different types and any combination of sensors is possible and within the scope of the teachings herein.

In one embodiment, the sensor(s) 240 are housed in a sensor unit 245. The sensor unit 245 is, in one embodiment, included or integrated in the safety monitoring housing 205, which provides for an integrated design. The sensor unit 245 is, in one embodiment, arranged on or to the safety monitoring housing 205, which provides for a more flexible design, easily enabling for varying the location and/or number of sensors 240 used. In one embodiment the sensor unit 245 is also arranged to house the alert means 250. This also enables for a distribution of both sensors 240 and alert means 250 on the arboriculture safety monitoring device 200 so that more than one direction may be covered.

FIG. 2B shows an example of an arboriculture safety monitoring device 200 according to one embodiment of the teachings herein. The arboriculture safety monitoring device 200 in this illustrative example is arranged with three sensor units 245, each carrying at least one sensor 240 and possibly alert means 250. As indicated above, it need not be the sensor 240 that carries the alert means, but the alert means could be arranged separately, but possibly together with the sensor(s).

The arboriculture safety monitoring device further comprises a fixating or attachment means 205A, which in one embodiment is a belt or strap 205A that enables the arboriculture safety monitoring device 200 to be fixed around the trunk of a tree (as indicated with the dashed lines and referenced T). A clasp or buckle (not shown), a Velcro™ arrangement or a hook-and-loop strap closure, may be used to enable the arboriculture safety monitoring device 200 to be mounted on trees or other objects of varying size. In one embodiment, the strap 205A is flexible for facilitating mounting on objects. The attachment means 205A being a strap with closure means as exemplified is an example of an attachment means that does not require tools for being attached to an object. It may therefore be referred to as a tool-free-attachment means 205A.

Another examples of attachment means 205A are hooks to be hung on a protruding element of an object. The attachment means 205A being a hook is also an example of an attachment means that does not require tools for being attached to an object and it may also be referred to as a tool-free-attachment means 205A.

Other examples of attachment means 205A are nails or screws to be inserted into an object, a pole to be driven into the ground to mention a few examples. If the pole is given a screw-like shape, it may also be referred to as a tool-free-attachment means 205.

As can be seen in FIG. 2B, the arboriculture safety monitoring device 200 is arranged with multiple sensors 240 to enable the arboriculture safety monitoring device 200 to cover more than one direction. The sensors 240 may be interconnected through a wired connection or alternatively wirelessly. Combinations of connections are also possible, with some sensors being connected through a wired interface, and some wirelessly connected. In an embodiment where the sensor 240 is a proximity sensor, the arboriculture safety monitoring device 200 may thus be enabled to detect the presence of a user or another person in all directions. Should the presence of a user or other person be detected, and it is optionally detected that the user or other person is within the range associated with the sensor 240, a signal to the alerting means may be transmitted enabling and causing the alert means to emit an alert. The alert may be designed to alert other users that a user or other person has entered a safety zone. The alert may alternatively or additionally be designed to inform the user or other person entering the safety zone of the fact that a safety zone has been entered.

As should be realized, even though FIG. 2B shows all sensors 240 being arranged on the same holder, i.e. the strap, one or more of the sensors may be arranged on a separate holder, thereby enabling and facilitating a wider distribution of the sensors 240. In an embodiment where the sensors are distributed on separate holders, the sensors are preferably, but not necessarily, wirelessly connected to the arboriculture safety monitoring device 200.

Additionally or alternatively, the arboriculture safety monitoring device 200 may be configured to transmit a signal to an arboriculture safety user interface device 100 enabling and causing the arboriculture safety user interface device 100 to alert the user of the arboriculture safety user interface device 100 that a user or other person has entered the safety zone.

The arboriculture safety monitoring device 200 may also comprise a user interface 270 comprising zero, one or more buttons, zero, one or more lights that are arranged to light up in a controlled manner for providing information, and/or zero, one or more displays for providing information. The display may be a touch display, wherein zero, one or more of the zero, one or more buttons may be a virtual button.

In the following the cooperation of the arboriculture safety user interface device 100 and the arboriculture safety monitoring device 200 will be discussed in more detail by referring to an arboriculture safety monitoring system 300. FIG. 3 shows an example of such an arboriculture safety monitoring system 300 according to the teachings herein. In this example an arboriculture safety monitoring device 200 is arranged on an object, a tree. One or more users, in this example arborists, are equipped with arboriculture safety user interface devices 100. In this example there are shown two arborists A1 and A2, both equipped with each an arboriculture safety user interface device 100-1 and 100-2 respectively, however, any number of users, arborists or other personnel, or rather their arboriculture safety user interface devices 100 may be part of the system 300.

As shown in FIG. 3, the arboriculture safety monitoring device 200 is enabled to communicate with at least one of the arboriculture safety user interface devices 100. This enables the arboriculture safety user interface device 100 and the arboriculture safety monitoring device 200 to exchange data with one another. It may also enable one arboriculture safety user interface device 100 to indirectly communicate with another arboriculture safety user interface device 100. In the example of FIG. 3 and as has also been discussed above, the arboriculture safety user interface devices 100 may also be arranged to communicate with one another directly.

As is also shown in FIG. 3, more than one arboriculture safety monitoring devices 200 may be used, in order to cover a larger area and/or to effect more than one safety zone.

Figure 4A:
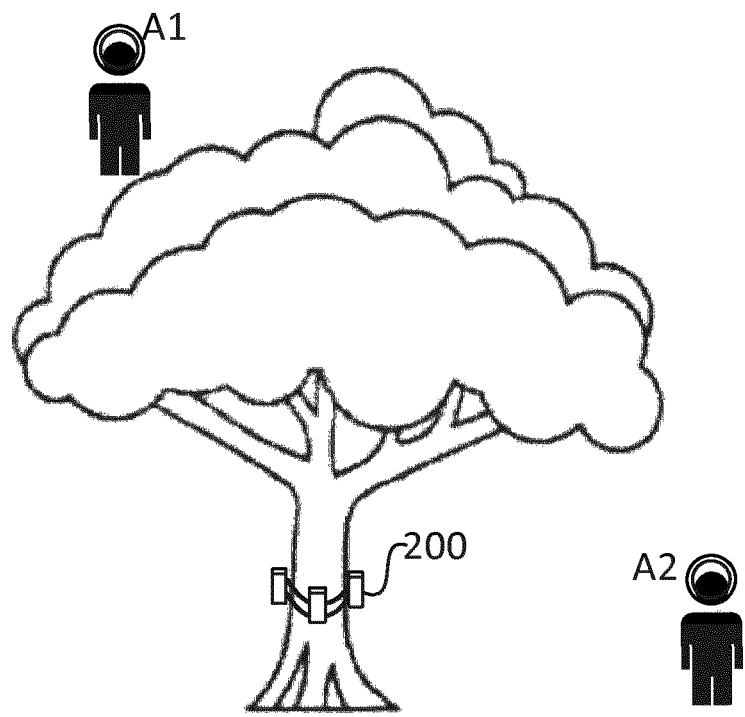
FIG. 4A shows a schematic view of an instance of an example use case of an arboriculture safety monitoring system according to one example of the teachings herein.
Figure 4B:
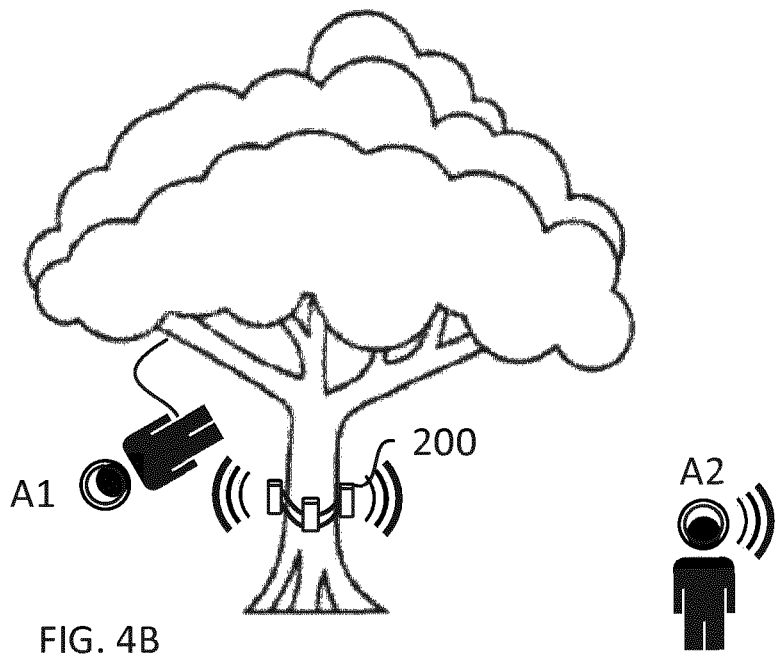
FIG. 4B shows a schematic view of a later instance of the example use case of an arboriculture safety monitoring system according to one example of the teachings herein as shown in FIG. 4A.

Returning to the example of an arborist falling discussed in relation to the arboriculture safety user interface devices 100 communicating with each other, reference is made to FIGS. 4A and 4B.

FIG. 4A shows a schematic view of an instance of an example use case of an arboriculture safety monitoring system according to one example of the teachings herein. In the example of FIG. 4A a first arborist A1 is currently operating up in the tree and a second arborist is operating on the ground. Their line of vision to each other may be blocked or obstructed by the tree they are working on.

At one point, the first arborist A1 suffers a fall, which is detected by the fall sensor 160 of an arboriculture safety user interface device 100, such as one exemplified and detailed in FIGS. 1A and 1B, being carried by the first arborist. As the fall is detected, the first arboriculture safety user interface device 100-1, i.e. the arboriculture safety user interface device 100 of the first arborist A1, sends data concerning this event to the second arboriculture safety user interface device 100-2, i.e. the arboriculture safety user interface device of the second arborist.

FIG. 4B shows a schematic view of a later instance of the example use case of an arboriculture safety monitoring system according to one example of the teachings herein as shown in FIG. 4A, showing the instance after the first arborist has fallen. As the second arboriculture safety user interface device 100-2 receives the data indicating the fall event, the alert means 150 are activated, thereby alerting the second arborist A2 of the fall of the first arborist A1. The alert may be, as discussed above, in the manner of a vibration, a sound signal, a light signal, and/or a voice message informing the second arborist of the detected event. This is indicated in FIG. 4B by sound waves being emitted from the second arboriculture safety user interface device 100, i.e. the arboriculture safety user interface device of the second arborist A2. This enables the second arborist to become aware of the first arborist's A1 predicament so that assistance may be offered. At least, the second arborist A2, may utilize the voice communication channel provided by the arboriculture safety user interface devices 100 to enquire whether the first arborist A1 is in need of assistance or not.

As is also indicated in FIGS. 4A and 4B, an arboriculture safety monitoring device 200, such as one exemplified and detailed in FIGS. 2A and 2B, may be arranged on (or close to) the tree being worked on. The arboriculture safety monitoring device 200 is connected to the arboriculture safety user interface devices 100-1, 100-2, either directly or indirectly as has been disclosed above. The arboriculture safety monitoring device 200 may also be configured to receive the data indicating the event, in this example the fall, from the first arboriculture safety user interface device 100-1 transmitting the data to the arboriculture safety monitoring device 200 and/or from the second arboriculture safety user interface device 100-2 forwarding the data. This enables for alerting other users or persons of the event, thereby increasing the chances of assistance being offered to the first arborist A1.

Figure 5A:
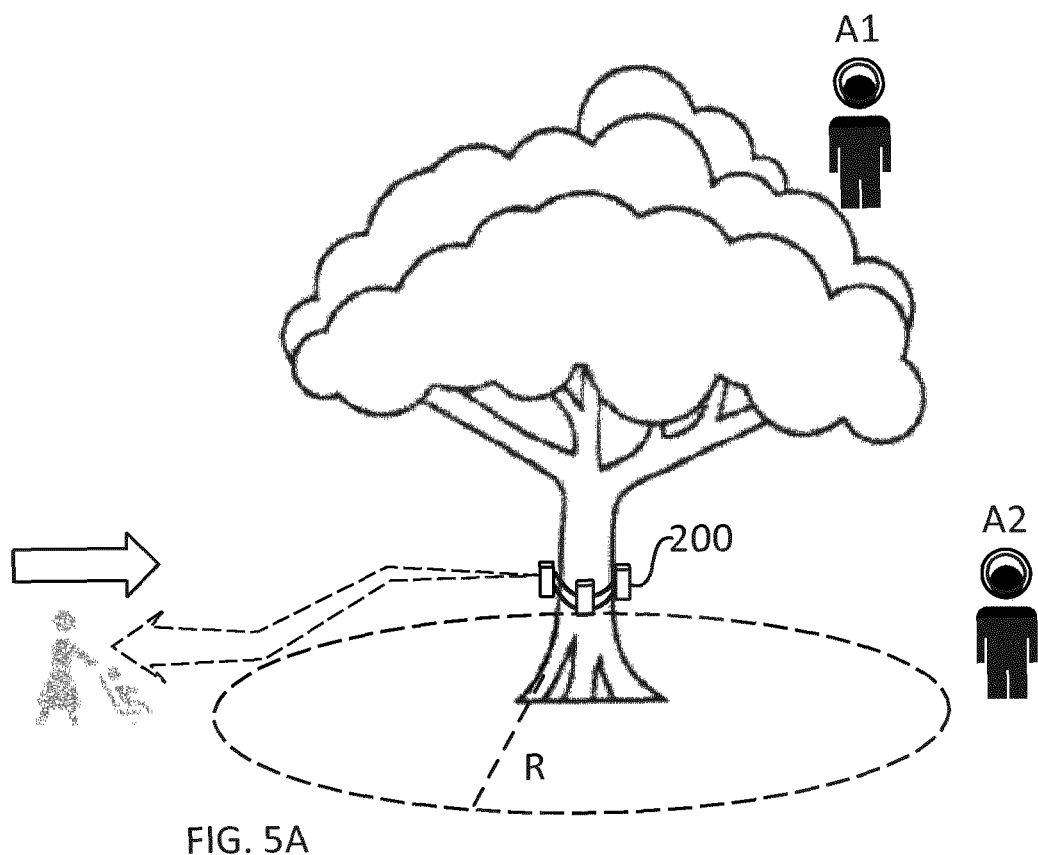
FIG. 5A shows a schematic view of an instance of an example use case of an arboriculture safety monitoring system according to one example of the teachings herein.
Figure 5B:
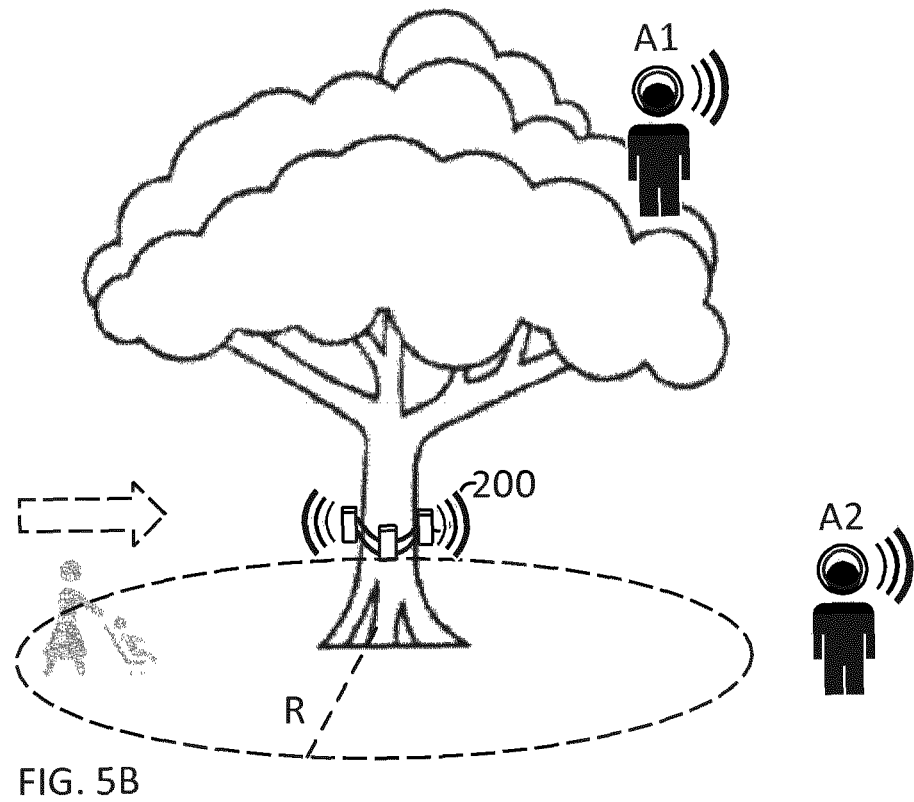
FIG. 5B shows a schematic view of a later instance of the example use case of an arboriculture safety monitoring system according to one example of the teachings herein as shown in figure SA.

Returning to the example of a person entering a safety zone discussed in relation to the arboriculture safety monitoring devices 200 detecting presence of such a person, reference is made to FIGS. 5A and 5B.

FIG. 5A shows a schematic view of an instance of an example use case of an arboriculture safety monitoring system according to one example of the teachings herein. In this example a first arborist A1 and a second arborist A2 are working on or around a tree, the first arborist A1 working up in the tree and the second arborist working on the ground. The tree is arranged with an arboriculture safety monitoring device 200, such as one exemplified and detailed in FIGS. 2A and 2B. The arboriculture safety monitoring device 200 is associated with a safety zone determined by a range R. At one time a civilian indicated by a woman walking with a stroller, is approaching the tree, the movement of the woman being indicated by the dashed arrow. The presence of the woman is detected by at least one sensor 240 of the arboriculture safety monitoring device 200, as is indicated by the dashed zigzagged arrow in figure 5A. The arboriculture safety monitoring device 200 is configured to determine that the woman enters the safety zone, i.e. that the woman is within the range R of the sensor 240, and in response thereto emit an alert.

FIG. 5B shows a schematic view of a later instance of the example use case of an arboriculture safety monitoring system according to one example of the teachings herein as shown in figure 5A, after the instance when it has been determined that the person, exemplified by the woman, has entered the safety zone. The arboriculture safety monitoring device 200 emits an alert to make at least one of the arborists A1 and A2 aware that a person has entered the safety zone. The alert may be emitted through alert means 250 of the arboriculture safety monitoring device 200. The alert may be, as discussed above, in the manner of a vibration, a sound signal, a light signal, and/or a voice message informing the arborists of the detected event. This is indicated in FIG. 5B by sound waves being emitted from the arboriculture safety monitoring device 200.

The alert may also be communicated to at least one of the arboriculture safety user interface devices 100-1, 100-2, for being emitted through the receiving arboriculture safety user interface device 100. The receiving arboriculture safety user interface device 100, may also forward the alert to the other arboriculture safety user interface device 100. The alert may be emitted through the arboriculture safety user interface device as in the manner of a vibration, a sound signal, a light signal, and/or a voice message informing the arborist of the detected event. This is indicated in FIG. 5B by sound waves being emitted from the arboriculture safety user interface devices 100.

The alert being transmitted through the arboriculture safety monitoring device's 200 alert means 250 enables arborists or other persons in the vicinity to become aware that a person has entered the safety zone, even if their line of sight is blocked or obscured or if the environment is too noisy to hear the woman walking.

The alert being transmitted through the arboriculture safety user interface device's 100 alert means 150 enables arborists or other persons carrying an arboriculture safety user interface device 100 to become aware that a person has entered the safety zone, even if their line of sight is blocked or obscured or especially if the environment is too noisy to hear the woman walking. Of course, the same monitoring may be used to ensure that other arborists or staff have also not entered the safety zone. To enable a co/worker from entering the safety zone without sounding an alarm, the arboriculture safety user interface device 100 may be arranged with a control 170 for activating the safety zone, or temporarily deactivating the safety zone. As is shown in FIG. 3, the arboriculture safety user interface device 100 may also be arranged to communicate with a working tool 320 of the arborist A1, for example a chainsaw, whereby the arboriculture safety user interface device 100 could be informed when the working tool 320 is activated and then activate the safety zone. Alternatively or additionally, the arboriculture safety monitoring device 200 is arranged to communicate with a working tool 320 of the arborist A1, whereby the arboriculture safety monitoring device 200 could be informed when the working tool 320 is activated and then activate the safety zone. Alternatively or additionally the arboriculture safety user interface device 100 and/or the arboriculture safety monitoring device 200 being informed of the operation of the working tool 320, could also be arranged to forward this information to other parts (arboriculture safety user interface devices 100 or arboriculture safety monitoring devices 200) of the system 300 so that all users may be made aware that the working tool is now operative. In order to facilitate this sharing of operating data the working tool 320 is arranged with operating sensor and communication interfaces 320 arranged to determine that the working tool is operational and transmit operation to this effect to other components of the system 300.

In one embodiment, the arboriculture safety monitoring device 200 and/or the arboriculture safety user interface device 100 may be configured to determine that an event has happened, such as a fall, or a person having entered the safety zone, and in response thereto transmit a signal to the working tool 320 through the communication interfaces 130, 230, 325, deactivating the working tool 320, thereby reducing the risk of the working tool 320 causing damage.

In one embodiment, the working tool 320 is paired with an arboriculture safety user interface device 100, thereby enabling identifying which user is operating which working tool 320.

Returning to FIG. 3, a cloud server or service 310 may also be part of or connected to the system 300. The cloud service 310 may communicate with the arboriculture safety monitoring device 200 for receiving data on persons entering the safety zone, data on equipment operation, such as working tool operation, any falls, any periods of inactivity, or other working related conditions. The service provider may then choose to take appropriate responsive action, such as alerting medical services, enquire with the arborist if or inform that service of the working tool 320 is needed.

The cloud service 310 may communicate with the arboriculture safety user interface devices 100, either directly or indirectly, for providing data on service being needed on working tools, that assistance is on its way, that work should be paused for a period of time, due to external factors (perhaps such as bad weather approaching).

The connection with a service provider ensures a good working relationship between a service provider, such as an equipment manufacturer, and the arborist which further aims to improve the safety of the arborist as the working equipment is then kept up to standards through (repeated) service.

Figure 6:
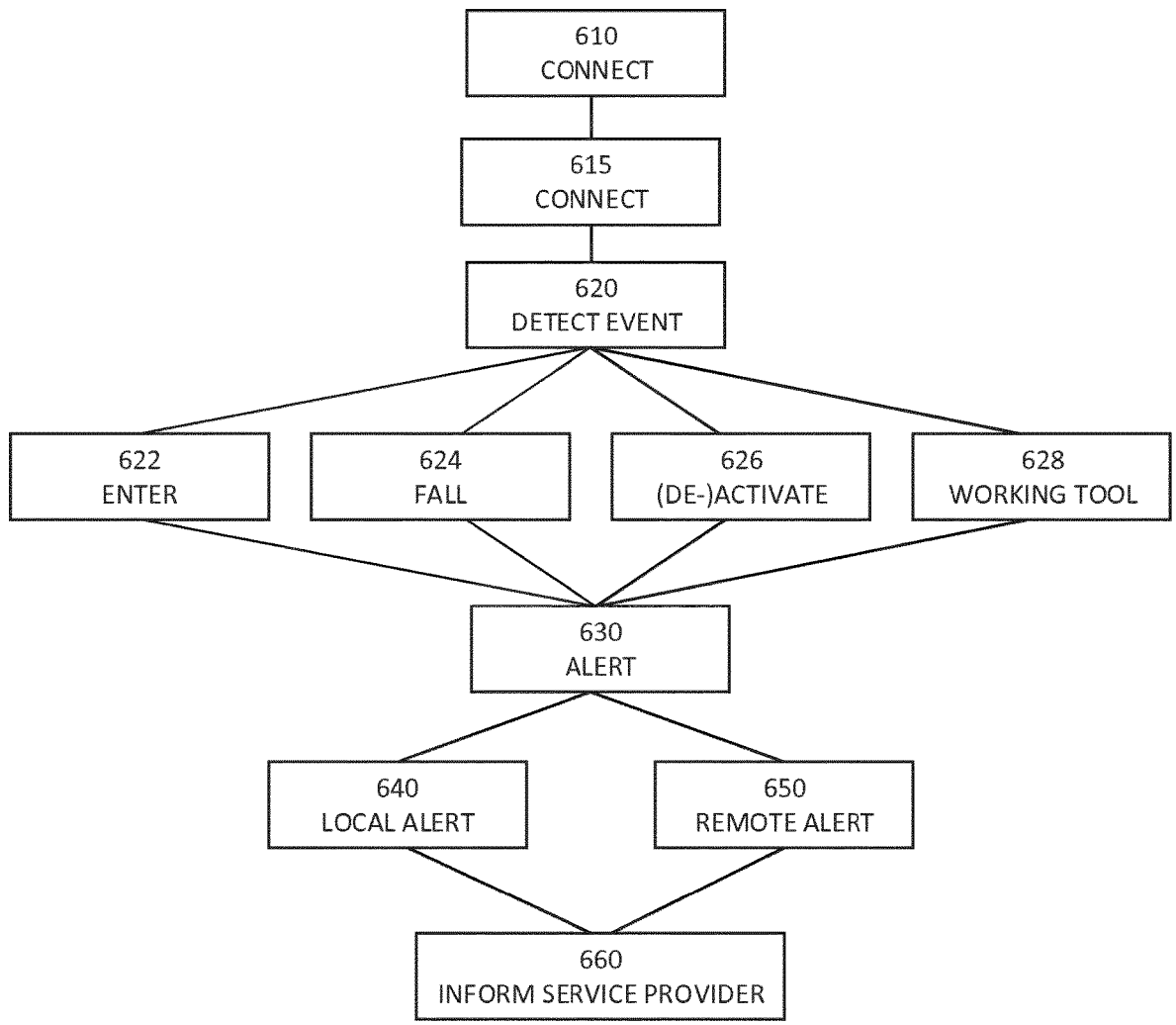
FIG. 6 shows a flowchart for a method to be used in an arboriculture safety monitoring system according to an example embodiment.

FIG. 6 shows a flowchart for a general method to be used in an arboriculture safety monitoring device 200 according to an example embodiment.

An arboriculture safety monitoring device 200 is configured to establish a communication connection 610 with at least one arboriculture safety user interface device 100. The arboriculture safety monitoring device 200 is further configured to detect 620 that an event has taken place, and in response thereto emit 630 an alert. The detection of the event may be done by receiving data to that effect. The alert may be emitted locally 640 through alerting means 250 of the arboriculture safety monitoring device 200 and/or by communicating with the arboriculture safety user interface device 100 and thereby emitting the alert remotely 650 through alerting means 150 of the arboriculture safety user interface device 100.

In one embodiment the event is that an object, such as a person, has entered 622 a safety zone. The determination that a person has entered the safety zone may be determined based on that a person has come in range of a sensor 240 of the arboriculture safety monitoring device. In one embodiment this event is only qualified to emit an alert to that effect if the safety zone is activated. In one embodiment, an alert may be emitted even if the safety zone is deactivated informing users that a person is in the safety zone, thereby informing the users to postpone operation until the safety zone is clear.

In one embodiment, all operation is deactivated until the safety zone is clear, that is until the arboriculture safety monitoring device 200 can no longer detect the presence of any persons in the safety zone.

In one embodiment the event is that a user has fallen 624, by receiving data on a fall event from the arboriculture safety user interface device 100.

In one embodiment the event is that the safety zone is to be activated or deactivated 626 by receiving a command to that effect.

In one embodiment the event is that a working tool 320 has been activated or deactivated 628. Optionally, the safety zone is activated or deactivated as appropriately in response thereto.

In one embodiment the arboriculture safety monitoring device 200 is further arranged to send 660 data regarding the event to a service provider 310.

Figure 7:
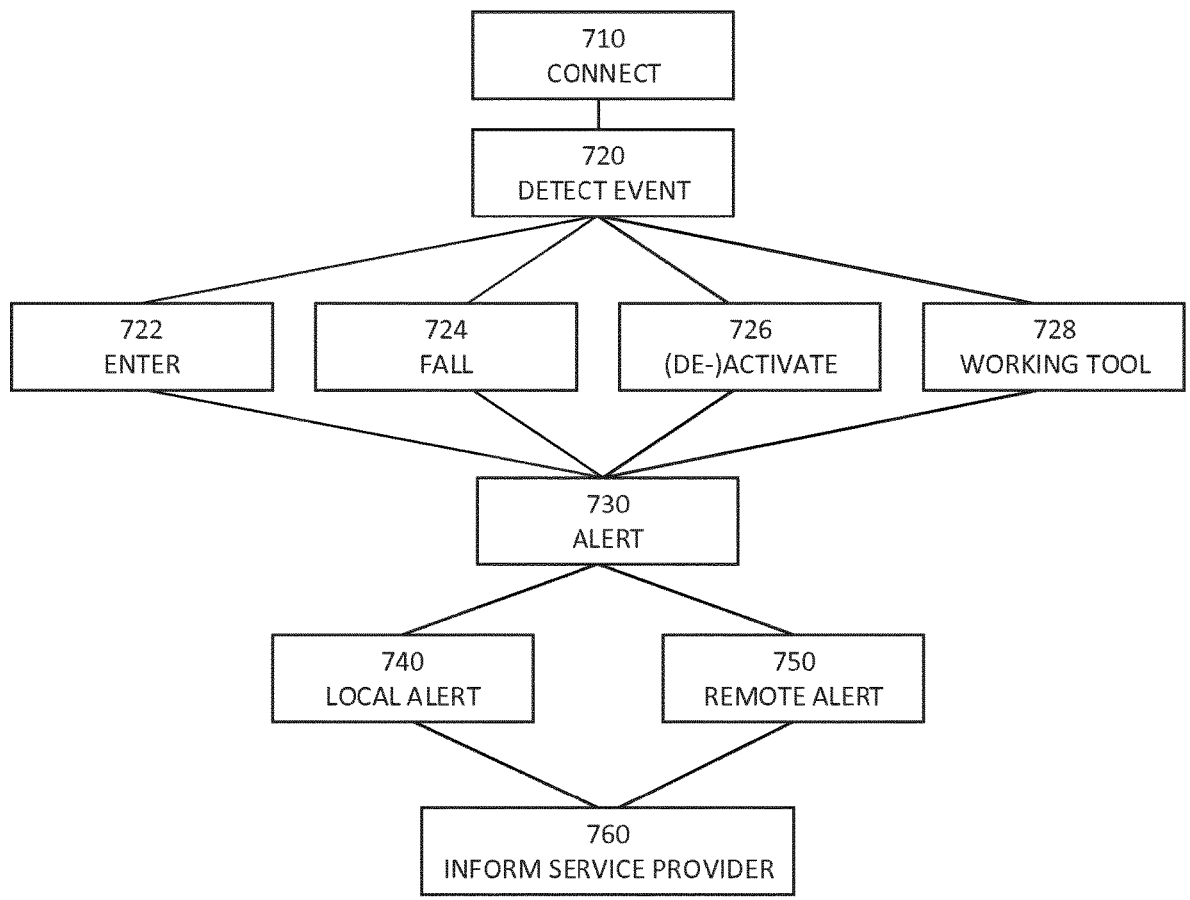
FIG. 7 shows a flowchart for a method to be used in an arboriculture safety user interface device according to an example embodiment.

FIG. 7 shows a flowchart for a general method to be used in an arboriculture safety user interface device 100 according to an example embodiment.

An arboriculture safety user interface device 100 is configured to establish a communication connection 710 with at least one other arboriculture safety user interface device 100. The arboriculture safety user interface device 100 may further be configured to establish a connection 715 with at least one arboriculture safety monitoring device 200. The arboriculture safety user interface device 100 is further configured to detect 720 that an event has taken place, and in response thereto emit 730 an alert. The detection of the event may be done by receiving data to that effect. The alert may be emitted locally 740 through alerting means 150 of the arboriculture safety user interface device 100 and/or by communicating with the arboriculture safety monitoring device 200 and/or the other arboriculture safety user interface device 100 and thereby emitting the alert remotely 750 through alerting means 250 of the arboriculture safety monitoring device 200 and/or through alerting means 150 of the other arboriculture safety user interface device 100.

In one embodiment the event is that an object, such as a person, has entered 722 a safety zone, data on this being transmitted from the arboriculture safety monitoring device 200, or being relayed by the other arboriculture safety user interface device 100. The conditioning of the safety zone, may be the same as disclosed with reference to FIG. 6.

In one embodiment the event is that a user has fallen 724. In one instance it is determined that the user of the arboriculture safety user interface device 100 is falling, whereby the event is detected by the fall sensor 160 of the arboriculture safety user interface device 100. In another instance, it is detected that another user has fallen, whereby the event is detected by receiving data on the fall event from the other arboriculture safety user interface device 100 or being relayed by the arboriculture safety monitoring device 200.

In one embodiment the event is that the safety zone has been activated or deactivated 726.

In one embodiment the event is that a working tool 320 has been activated or deactivated 728.

In one embodiment the arboriculture safety user interface device 100 is further arranged to send 760 data regarding the event to a service provider 310.

Figure 8:
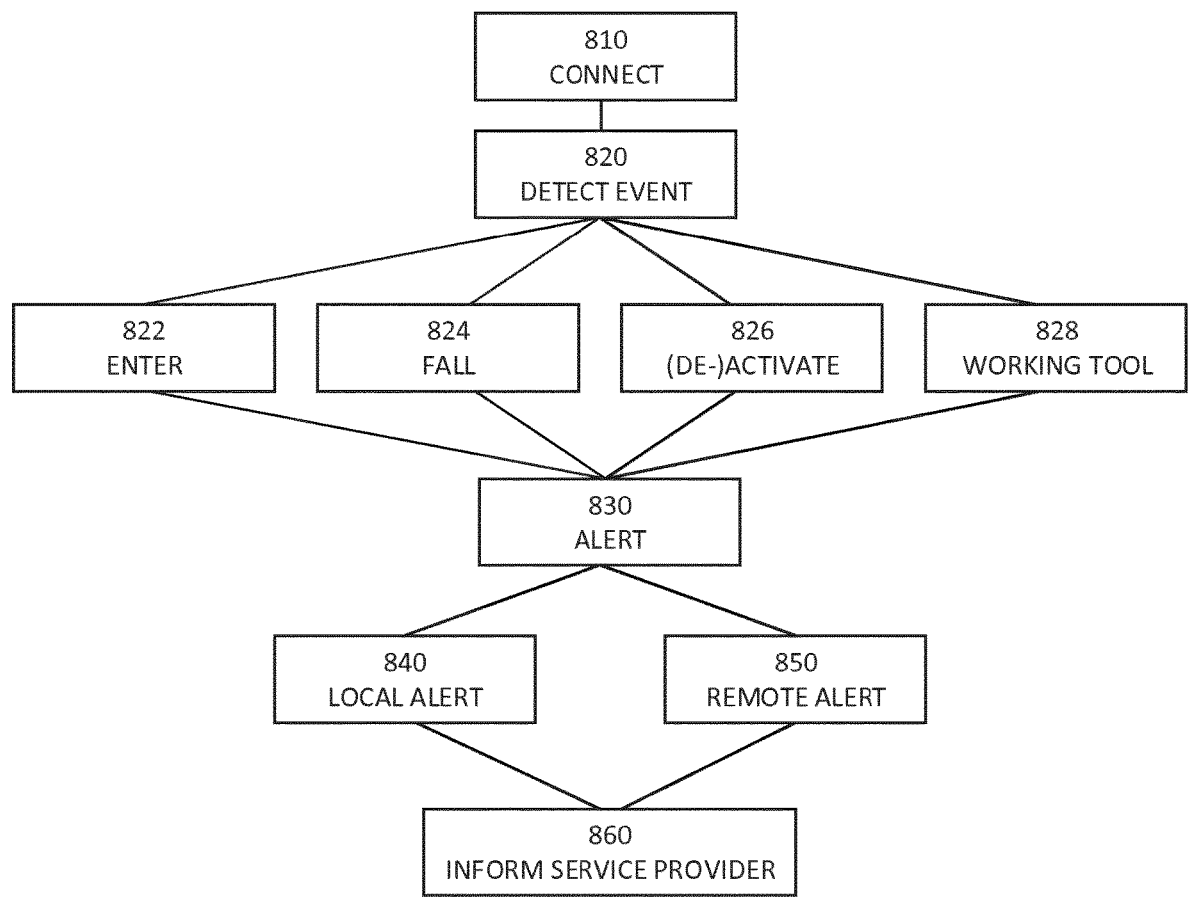
FIG. 8 shows a flowchart for a method to be used in an arboriculture safety monitoring device according to an example embodiment.

FIG. 8 shows a flowchart for a general method to be used in an arboriculture safety monitoring system 300 according to an example embodiment.

At least one arboriculture safety user interface device 100 is configured to establish a communication connection 810 with at least one arboriculture safety monitoring device 200 and possibly at least one other arboriculture safety user interface device 100, the system 300 thereby comprising at least one arboriculture safety user interface device 100 being communicatively connected to at least one arboriculture safety monitoring device 200 and possibly communicatively connected to at least one other arboriculture safety user interface device 100. The system 300 is further configured to detect 820 that an event has taken place, and in response thereto emit 830 an alert. The detection of the event may be done by any of the arboriculture safety user interface device (s) 100 and/or the arboriculture safety monitoring device(s) 200, either through a local determination using data from a sensor, or by receiving data to that effect from one of the other the arboriculture safety user interface device(s) 100 and/or arboriculture safety monitoring device(s) 200. The alert may be emitted locally 840 through alerting means 150, 250 of the device 100, 200 detecting the event and/or by communicating with another device 100, 200 and thereby emitting the alert remotely 850 through alerting means 150, 250 of the another device 150, 250.

Implementation details on the events correspond to the details given with reference to FIGS. 6 and 7 and apply as appropriately depending on which device in the system performs which action.

Implementation details on the alerts correspond to the details given with reference to FIGS. 6 and 7 and apply as appropriately depending on which device in the system performs which action.

In one embodiment the event is that an object, such as a person, has entered 822 a safety zone. The conditioning of the safety zone, may be the same as disclosed with reference to FIG. 6.

In one embodiment the event is that a user has fallen 824.

In one embodiment the event is that the safety zone has been activated or deactivated 826.

In one embodiment the event is that a working tool 320 has been activated or deactivated 828.

In one embodiment the system is further arranged to send 860 data regarding the event to a service provider 310.

In one embodiment, the arboriculture safety monitoring device 200 may be used as a standalone unit, without being connected to an arboriculture safety user interface device 100. In such an embodiment the arboriculture safety monitoring device may be arranged without a communications interface 230 as no connection need be established with an arboriculture safety user interface device 100. This enables for a cheaper arboriculture safety monitoring device 200. In some embodiments the standalone arboriculture safety monitoring device 200 may be used in combination with connected arboriculture safety monitoring devices 200, increasing the likelihood of detecting a passer-by and at least alerting through alert means 250.

The standalone arboriculture safety monitoring device 200 may be used and configured as in any of the embodiments above, apart from features relating solely to the communication interface. As such any details on the housing 205, the attachment means 205A, the sensor units 245, the sensors 240, the alert means 250, the controller 220, the memory and any user interface apply to the standalone arboriculture safety monitoring device 200 as well, excluding only those features solely relating to the communication interface 230, and embodiments may be freely combined where possible, as would be apparent to a skilled person.

The invention claimed is:

1. An arboriculture safety monitoring device comprising at least one proximity sensor, alerting means, at least one carrier on which the at least one sensor is arranged, a controller and a communication interface, the arboriculture safety monitoring device being configured to:
   establish a communication connection with at least one arboriculture safety user interface device;
   detect a fall event wherein an arborist has fallen, and in response thereto, deactivate a work tool; and
   detect an intrusion event wherein a person has entered a safety zone, and in response thereto, emit an alert through the alerting means and through alerting means of the arboriculture safety user interface device; and
   activate a safety zone responsive to a work tool being activated,
   wherein the safety zone is further configured to be activated and temporarily deactivated by the arboriculture safety user interface device,
   wherein the alert through the alerting means of the arboriculture safety monitoring device informs the person that has entered the safety zone that the safety zone has been entered, and
   wherein the alert through the alerting means of the arboriculture safety user interface device informs the arborist that the person has entered the safety zone.

2. The arboriculture safety monitoring device according to claim 1, wherein the sensor is associated with a range representing the safety zone, and the arboriculture safety monitoring device is further configured to detect that the person has entered the safety zone by determining that the person is within the range of the sensor.

3. The arboriculture safety monitoring device according to claim 1, wherein arboriculture safety monitoring device is further configured to emit the alert remotely by communicating with the arboriculture safety user interface device and thereby emitting the alert remotely through alerting means of the arboriculture safety user interface device.

4. The arboriculture safety monitoring device according to claim 1, wherein the device detects the fall event by receiving data on the fall event from an arboriculture safety user interface device.

5. The arboriculture safety monitoring device according to claim 1, wherein the at least one sensor is a plurality of sensors, wherein the plurality of sensors are arranged on said at least one carrier by being distributed on the carrier.

6. The arboriculture safety monitoring device according to claim 1, wherein said at least one carrier is arranged to be attached to a tree.

7. The arboriculture safety monitoring device according to claim 1, wherein in response to detecting the fall event, the arboriculture safety monitoring device is configured to alert a medical service via a cloud server, and inform the arborist via the cloud server and the at least one arboriculture safety user interface device when the medical service is en route to assist.

8. An arboriculture safety user interface device comprising at least one sensor of which at least one is a fall sensor, a controller and a communication interface, the arboriculture safety user interface device being configured to:
   establish a communication connection with at least one other arboriculture safety user interface device;
   detect that a fall event has taken place; and
   activate and temporarily deactivate a safety zone
   wherein responsive to detecting the fall event, the arboriculture safety user interface device deactivates a work tool.

9. The arboriculture safety user interface device according to claim 8, wherein the arboriculture safety user interface device further comprises alerting means and wherein the arboriculture safety user interface device is further configured to emit an alert at least through the alerting means in response to detecting the fall event.

10. The arboriculture safety user interface device according to claim 8, wherein the arboriculture safety user interface device is further configured to detect that the fall event has taken place by receiving data from the at least one fall sensor to that effect, indicating that a user of the arboriculture safety user interface device that has fallen, and in response thereto emitting an alert through at least alerting means of the another arboriculture safety user interface device.

11. The arboriculture safety user interface device according to claim 8, wherein the arboriculture safety user interface device is further configured to detect that the fall event has taken place by receiving data from the other arboriculture safety user interface device to that effect, indicating that a user of the another arboriculture safety user interface device has fallen, and in response thereto emitting an alert through at least the alerting means of the arboriculture safety user interface device.

12. The arboriculture safety user interface device according to claim 8, wherein the arboriculture safety user interface device is further configured to
   connect to an arboriculture safety monitoring device;
   detect that an event has taken place and in response thereto
   emit an alert, wherein the detection of that the event has taken place is based on receiving data to that effect from the arboriculture safety monitoring device and thereby emitting the alert at least through alerting means of the arboriculture safety user interface device, and/or wherein the detection of that the event has taken place is based on receiving data to that effect from the sensor and thereby emitting an alert at least through alerting means of the arboriculture safety monitoring device.

13. The arboriculture safety user interface device according to claim 8, wherein the arboriculture safety user interface device is further configured to detect an event indicating that an object, such as a person, has entered a safety zone, that a user has fallen, that the safety zone has been activated or deactivated, or that a working tool has been activated or deactivated.

14. The arboriculture safety user interface device according to claim 8, wherein the arboriculture safety user interface device is a communication headset comprising noise cancelling technology and a laryngophone for audible communication in loud or noisy environments.

15. A method for use in an arboriculture safety monitoring device comprising at least one proximity sensor, alerting means, at least one carrier on which the at least one sensor is arranged, and a communication interface, the method comprising:
   establishing a communication connection with at least one arboriculture safety user interface device;
   detecting a fall event wherein an arborist has fallen, and in response thereto, deactivating a work tool; and
   detecting an intrusion event wherein a person has entered a safety zone, and in response thereto, emitting an alert through the alerting means and through alerting means of the arboriculture safety user interface device, and
   activating a safety zone responsive to a work tool being activated
   wherein the alert through the alerting means of the arboriculture safety monitoring device informs the person that has entered the safety zone that the safety zone has been entered, and
   wherein the alert through the alerting means of the arboriculture safety user interface device informs an arborist that the person has entered the safety zone.

16. The method of claim 15, wherein the at least one sensor is a fall sensor, the method further comprising:
   establishing a communication connection with at least one other arboriculture safety user interface device;
   detecting that a fall event has taken place.

17. The method of claim 16, wherein the method further comprises:
   connecting to an arboriculture safety monitoring device;
   detecting that an event has taken place and in response thereto
   emitting an alert, wherein the detection of that the event has taken place is based on receiving data to that effect from the arboriculture safety monitoring device and thereby emitting the alert at least through the alerting means, and/or wherein the detection of that the event has taken place is based on receiving data to that effect from the sensor and thereby emitting the alert at least through alerting means of the arboriculture safety monitoring device.

18. The method of claim 15, wherein the at least one arboriculture safety monitoring device comprises at least one proximity sensor, and wherein the method further comprises the at least one arboriculture safety monitoring device:
   detecting that a person has come within range of the at least one proximity sensor, and in response thereto emitting an alert through alerting means of the arboriculture safety user interface device.

* * * * *